June 9, 1925.
H. K. ADAMS
POWER REVERSE MECHANISM FOR LOCOMOTIVES
Filed May 19, 1921    4 Sheets-Sheet 1
1,540,870
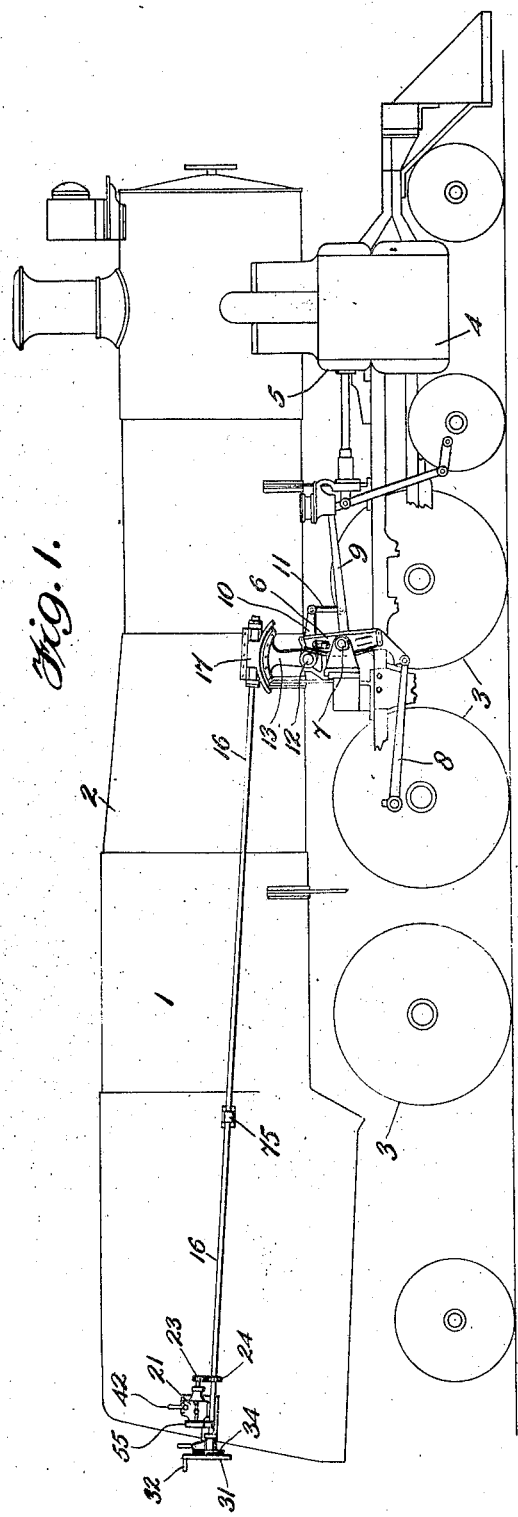
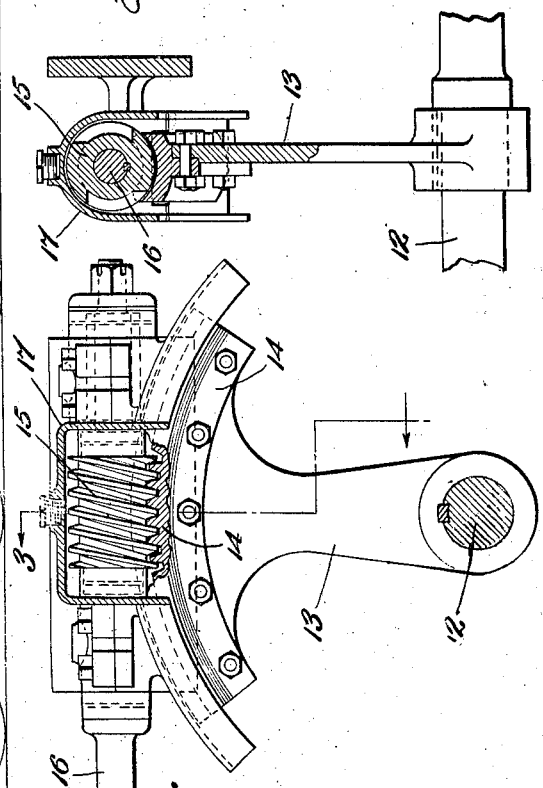
Inventor
Henry K. Adams,
By T. A. Witherspoon
Attorney June 9, 1925.  
H. K. ADAMS  
1,540,870  
POWER REVERSE MECHANISM FOR LOCOMOTIVES  
Filed May 19, 1921  
4 Sheets-Sheet 2
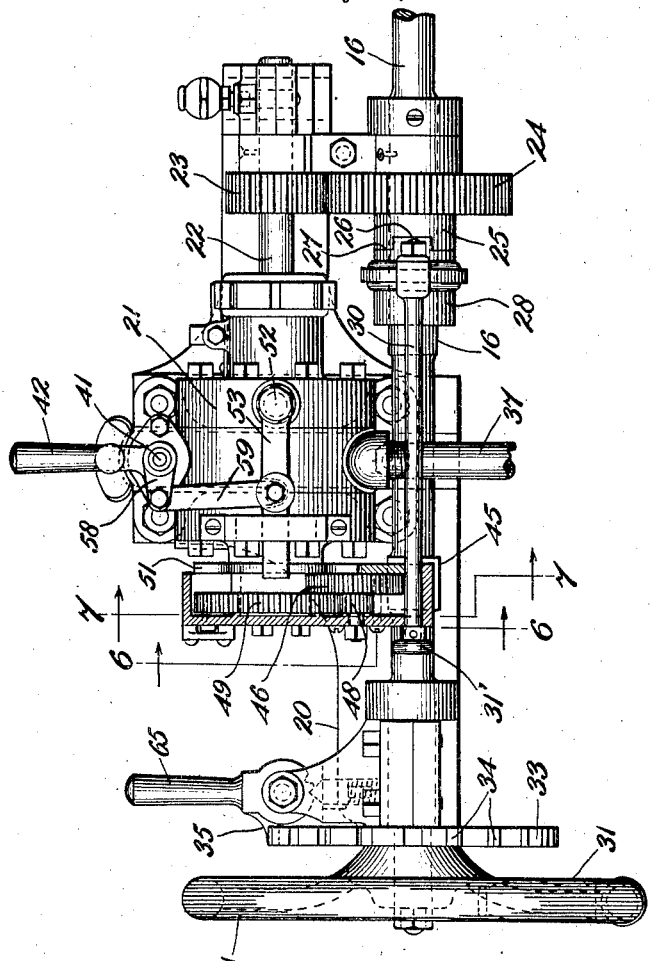
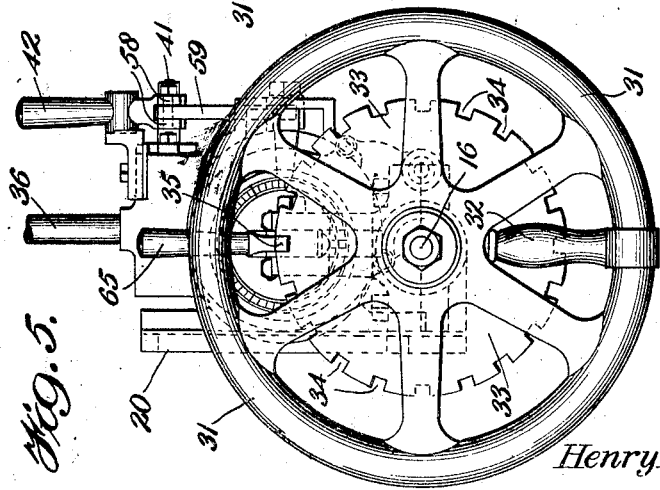
Inventor  
Henry K. Adams,  
By T. G. Witherspoon  
Attorney June 9, 1925.    1,540,870
H. K. ADAMS
POWER REVERSE MECHANISM FOR LOCOMOTIVES
Filed May 19, 1921    4 Sheets-Sheet 3
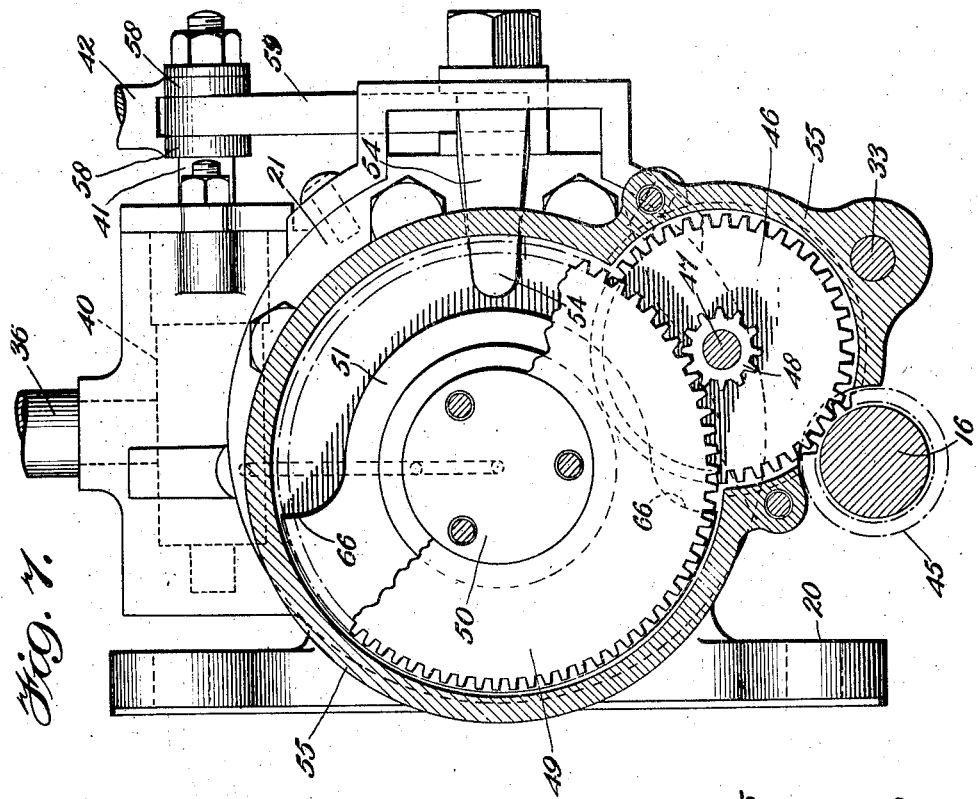
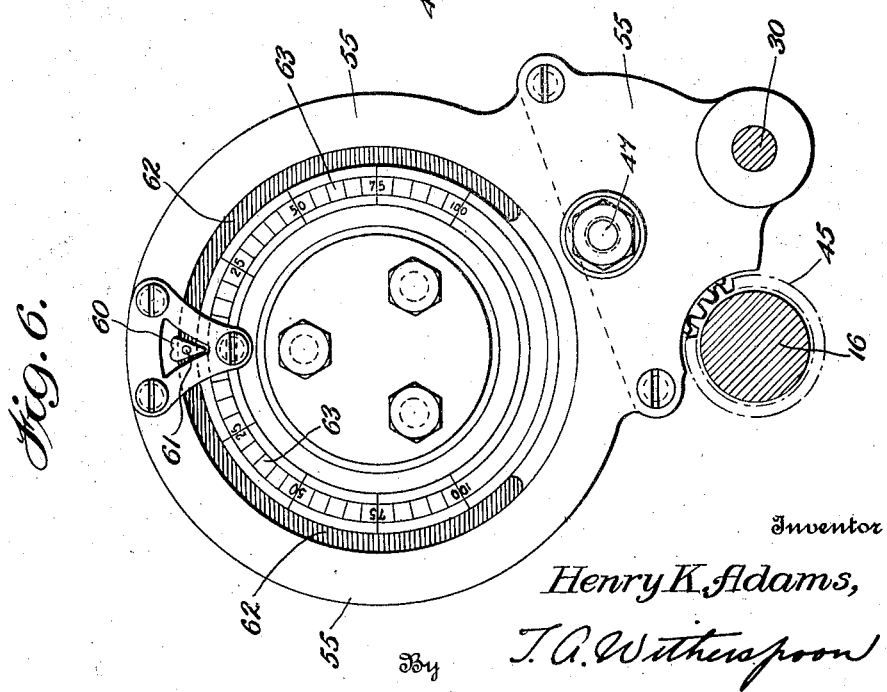
Inventor
Henry K. Adams,
By T. A. Witherspoon
Attorney June 9, 1925.
H. K. ADAMS
1,540,870
POWER REVERSE MECHANISM FOR LOCOMOTIVES
Filed May 19, 1921 4 Sheets-Sheet 4
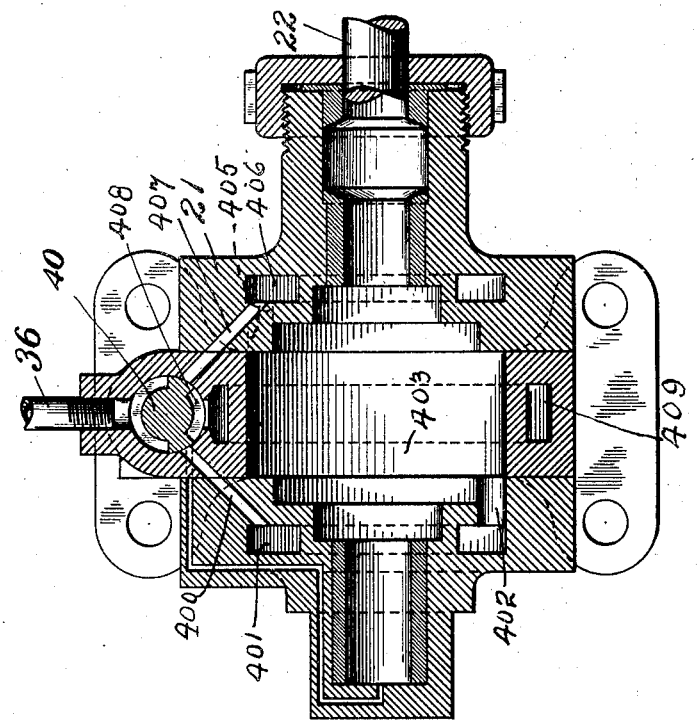
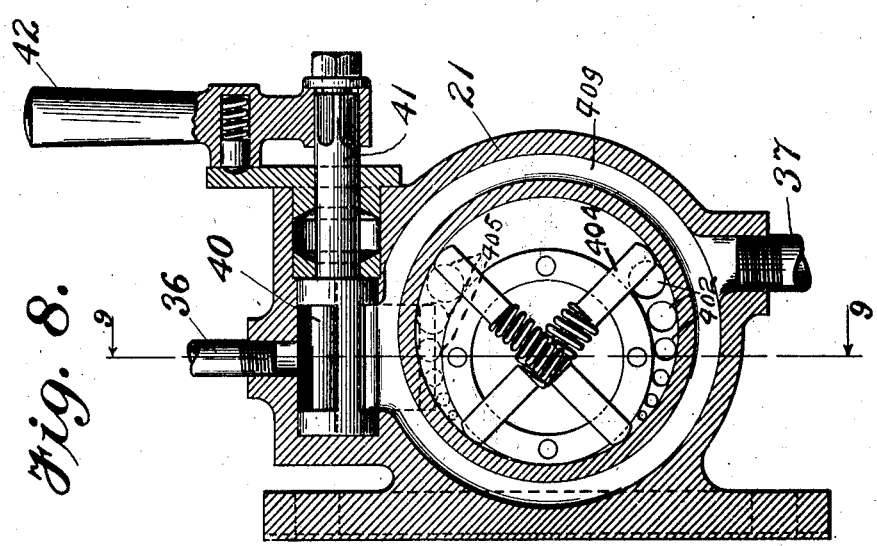
Inventor
Henry K. Adams,
By T. M. Witherspoon
Attorney Patented June 9, 1925.

1,540,870

UNITED STATES PATENT OFFICE.

HENRY K. ADAMS, OF NASHVILLE, TENNESSEE.

POWER REVERSE MECHANISM FOR LOCOMOTIVES.

Application filed May 19, 1921. Serial No. 470,999.

*To all whom it may concern:*

Be it known that I, HENRY K. ADAMS, a citizen of the United States, residing at Nashville, in the county of Davidson and State of Tennessee, have invented certain new and useful Improvements in Power Reverse Mechanisms for Locomotives; and I do hereby declare the following to be a full, clear, and exact description of the invention, such as will enable others skilled in the art to which it appertains to make and use the same.

This invention relates to power reverse mechanisms for locomotives, and has for its object to provide a device of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic side elevational view of a portion of the locomotive illustrating the present invention applied thereto;

Figure 2 is a fragmentary sectional elevational view of the worm and sector connections illustrated in Figure 1;

Figure 3 is a transverse vertical sectional view taken approximately on the line 3—3 of Figure 2, looking in the direction of the arrows;

Figure 4 is an enlarged elevational view, partially broken away, of the power unit, together with its transmission and automatic control mechanism, shown in Figure 1;

Figure 5 is an end elevational view of the parts shown in Figure 4 as seen from the left of said figure;

Figure 6 is an enlarged sectional elevational view taken approximately on the line 6—6 of Figure 4, looking in the direction of the arrows;

Figure 7 is a view similar to Figure 6, taken on the line 7—7 of Figure 4, looking in the direction of the arrows.

Figure 8 is a cross section of the auxiliary rotary engine showing the rotary piston and blades; and Figure 9 is a view taken on the line 9—9 of Figure 8, with the piston and blades removed.

1 indicates a locomotive provided with a boiler 2, driving wheels 3, cylinder 4, and steam chest 5. The engine is provided with the usual valve gear of any preferred type, such, for example, as the Walscheart gear, having a link 6 pivoted as at 7 and adapted to be oscillated about the said pivot by means of the connecting rod 8, which receives its motion from the driving wheels 3.

Associated with the said link 6 in the usual manner is the radius rod 9 adapted to be raised and lowered with respect to the said link by means of the bell crank lever 10 and connection 11 in the well known manner.

The said bell crank 10 may be pivoted upon the stub shaft 12 in the usual manner, and its arm 13 instead of being connected in the usual manner to the manually controlled reciprocating reverse rod is provided at its upper end with a gear sector 14 rigidly fastened to the said arm 13. Meshing with the teeth of the said sector 14 is a worm 15, see Figures 2 and 3, which worm is mounted upon the longitudinally extending power shaft 16 and may be enclosed in a suitable housing 17, as will be clear from the drawings. The mechanism just described is located in the usual position near the forward end of the boiler and the shaft 16 extends back along the said boiler to the cab, not shown, with which the engine may be provided. Secured to the boiler casing within the said cab as by the bracket 20 is a power unit of any suitable type here diagrammatically illustrated as a rotary engine 21.

Said rotary engine, as best shown in Figure 4, may be provided with a shaft 22 carrying spur gear 23 meshing with the gear 24 loosely mounted upon the shaft 16. Said gear 24 may be provided with the hub 25 having clutch teeth 26 adapted to coact with the companion teeth 27 in a companion clutch member 28 which latter member may be splined to the said shaft 16. The said member 28 may be moved longitudinally of the said shaft in any desired manner, as, for example, by the clutch rod 30 provided at its end with the knob or other gripping means 31', all as will be clear from Figure 4.

The said shaft 16 may extend through the clutch members 25 and 28 and may carry upon its extreme end the hand wheel 31 provided with the pivoted handle 32 adapted to be swung outwardly at right angles to the rim of the said wheel, should it be desired to manipulate the gear manually, all as will appear more fully below. Also mounted upon the said shaft 16 adjacent the hand wheel 31 is a disk 33 provided with a plurality of notches 34 with which a pivoted spring controlled dog 35 is adapted to engage to lock the parts in any desired position.

The engine 21 may be provided with an inlet steam pipe 36 and with the exhaust pipe 37, see Figures 4, 5, 8 and 9, and the flow of fluid to the said engine from the inlet pipe 36 may be controlled by means of a suitable valve 40.

This said valve may be provided with a valve stem 41 upon which is mounted the handle 42, whereby the said valve may be manually operated to control the flow of fluid whereby the engine 21 may be driven in either direction, or stopped, at will.

That is to say, steam being admitted through the pipe 36, and the valve 40 being in the proper position, steam will pass through the channel 400 into the annular passage 401, and out through the set of ports 402 into the rotor chamber 403 behind the rotor elements 404, and will pass out of said chamber through the set of ports 405 into the annular chamber 406 and through the channel 407 into the valve cavity 408 and thence into the exhaust passage 409, and pipe 37. As no claim is made herein to this auxiliary rotary engine as a separate invention, further details thereof are not deemed necessary. But it will be clear that when the valve 40 is so set as to cause steam to pass down the channel 401, the rotor 404 will turn in one direction, while if the valve 40 is so set as to admit steam into the channel 407, and ports 405, said rotor will turn in an opposite direction and the engine 21 will be reversed.

In order to protect the parts against damage which might result should the engine 21 be inadvertently permitted to run a longer period than is necessary to effect the complete movement of the valve gear to reverse the locomotive, an automatic control is associated with the valve 40, as will now be disclosed. Mounted upon the shaft 16 intermediate the gear 24 and the hand wheel 31 is a spur pinion 45 which meshes with an idler gear 46, mounted upon a stub shaft 47 carrying a pinion 48 meshing with the gear 49 loosely mounted upon the stud 50, all as will be clear from Figures 4 and 7 of the drawings.

Rigidly secured to the said gear 49 is a cam member 51 adapted to be rotated by the said gear 49.

Pivotally secured to the housing of the engine 21, as at 52, is a lever 53 having the bent end or extension 54 projecting through a suitable opening in the housing 55 surrounding the gear train 45, 46, 48, and 49, and lying in the path of the cam member 51. The valve handle 42 mounted upon the valve stem 41 is provided with the angularly extending arms 58 which are connected as by the pivoted link 59 to the lever member 53, as will be clear from the said figures. It thus results that should the lever 53 be moved in either direction by the cam 51, as will presently appear, the motion will be transmitted through the link 59 to the arms 58 of the valve handle 42 and to the valve stem 41 and valve 40, whereby the flow of fluid pressure from the supply pipe 36 to the engine may be cut off.

60 represents a suitable indicator rigidly secured to the gear 49 by means of a pin 61 passing through the slot 62 in the housing 55, see Figure 6, and the said indicator cooperates with a scale 63 carried by the housing 55 to indicate the position of the link block in the link and the point at which the valve gear cuts off, and likewise the position of the valve gear of the locomotive. For instance, if the pointer 60 is set at 25 the steam is cut off at 25% of the piston stroke.

75 indicates a slip joint or connection in the shaft 16 adapted to take care of the expansion and contraction of the boiler.

The operation of the invention will be clear from the foregoing, but may be briefly summarized as follows:

Supposing the parts to be in the positions illustrated in Figure 1, wherein the radius bar 9 is at substantially mid portion of the link 6, so that no motion will be transmitted by a movement of the link and that it be desired to run the locomotive ahead, the clutch members 25 and 28 being engaged by means of their manual control 31, the locking lever 65 is moved to the right as seen in Figure 4, thereby disengaging the dog 35 from the notch 34 in the locking disk 33, whereby rotation of the shaft 16 will be permitted. The valve handle 42 is next moved in the proper direction to admit fluid pressure to the rotary engine 21 to move the latter in the proper direction to raise or lower the radius bar 9. Motion from the rotor of the engine 21 will be transmitted to the shaft 22 to the gear 23 mounted thereon to the gear 24, clutch member 25, clutch 28, to shaft 16, to the worm 15, sector 14, bell crank 13 and link connection 11 to the radius bar 9, thus raising or lowering the same from its neutral position at the center of link 6 to any desired position above or below the said center. The exact position of the radius bar, of course, will depend upon the length of time the engine 21 is permitted to rotate, and this in turn will be controlled by the particular operating conditions obtaining at the time.

When the radius bar 9 has been moved a suitable distance, the valve lever 42 may be manually returned to its center position as illustrated in Figure 4, thereby cutting off the flow of fluid from the engine 21 and stopping all motion. The locking lever 65 may then be returned to its position shown in Figure 4 with the toe 35 engaging in one of the notches 34 in the locking disk 33, as will be readily apparent.

Should the engineer inadvertently omit to cut off the flow of steam to the engine 21 the automatic control mechanism above disclosed will accomplish this and prevent any damage to the various parts which might result from their continued operation. That is to say, so long as the engine 21 is in operation and the shaft 16 is revolving, the gear 45—Figure 7—is rotating the gear 46, which in turn is rotating the pinion 48, gear 49, and cam member 51. In view of the relatively high speed of a rotary steam engine this gear ratio is preferably quite large, say for example, twelve revolutions of shaft 16 to one of the cam 51. When the cam 51 is moved through a predetermined arc of a circle and corresponding to the movement which has been imparted to the radius bar 9, the raised portion 66 thereof will contact with the bent extension 54 of the lever 53—see Figures 4 and 7—and will move the same downwardly, which motion will be imparted through the link connection 59 and angular arms 58 to the lever 42, valve stem 41, and valve 40 to automatically cut off the steam supply.

It thus results that should the rotary engine be inadvertently left running, it will be automatically cut off when a certain predetermined position of the radius bar 9 has been reached, and injury to the various parts of the apparatus prevented.

The cam member 51 is so designed that it will operate the lever 53 when moved in either direction so that no matter in which direction the rotary engine is moving the automatic control will be effective. The position of the parts may be readily indicated to the engineer upon the scale 63 with which the control mechanism is provided.

Should it be desired for any reason to operate the locomotive reversing mechanism manually instead of through the power means as for example should the engine 21 break down, the clutch members 25 and 26 may be disengaged through the manually controlled clutch rod 30, whereupon the shaft 16 may be operated by means of the hand wheel 31 carried thereby and precisely the same movements of the radius bar 9 may be had as was the case when the engine was in operation.

By moving the shaft 16 only one notch at a time, as indicated upon the locking disk 33, it is possible by the construction here illustrated to obtain an adjustment of the radius rod as fine as, say, one tenth of an inch.

It will thus be seen that I have provided a simple, efficient power means for actuating the reversing mechanism for a locomotive engine, which means may be manually controlled through the medium of the valve handle 42 and which is provided with the automatic control device through which it is impossible for the engineer to injure the mechanical parts by carelessness or inadvertence in permitting the motor to run an undue length of time. It will also be seen that means are provided whereby the power mechanism may be disengaged and if conditions require it, the valve gear shifted manually, as at present.

It is obvious that those skilled in the art may vary the details of construction as well as the arrangement of parts without departing from the spirit of the invention, and therefore I do not wish to be limited to the above disclosures except as may be required by the claims.

What I claim is:

1. In a power reverse mechanism for steam engines provided with a link valve gear, the combination of a source of power comprising a reversible rotary motor; manually operated means for controlling said source of power; a lever linked to said means and provided with an extension; auxiliary automatic means comprising a gear train and a cam adapted to coact with said lever extension to control said manually operated means; connections between said source of power and said valve gear whereby the latter may be shifted; and a manually operated clutch governing said connections, substantially as described.

2. In a power reverse mechanism for steam engines provided with a link valve gear, the combination of a source of power; comprising a rotary motor; hand operated means for controlling said source of power; a lever linked to said means and provided with an extension; connections between said source of power and said valve gear whereby the latter may be shifted; a clutch governing said connections; and automatic means comprising a gear train and a cam adapted to coact with said lever extension to actuate said hand operated means to cut off said power when said gear has been shifted a predetermined amount, substantially as described.

3. In a power reverse mechanism for steam locomotives, provided with a link valve gear the combination of a source of power comprising a rotary motor; hand operated means for controlling said source of power; a lever linked to said means and provided with an extension; connections comprising a worm and sector between said source of power and said valve gear whereby the latter may be shifted; a clutch governing said connections; automatic means comprising a gear train and a cam adapted to coact with said lever extension to actuate said hand operated means to cut off said power when said valve gear has been shifted a predetermined amount; and independent means associated with said connections whereby said valve gear may be manually shifted, substantially as described.

4. In a power reverse mechanism for steam engines, provided with a link valve gear, the combination of a source of power comprising a rotary reversible steam motor; manually operated means for controlling said source of power; connections comprising a worm and sector between said source of power and said valve gear, whereby the latter may be shifted; a clutch governing said connections; automatic means comprising a gear train, a cam, and a lever coacting with said cam adapted to actuate said controlling means to cut off said power when said gear has been shifted a predetermined amount; independent means associated with said connections whereby said valve gear may be manually shifted; and means for locking the parts in any desired position, substantially as described.

5. In a power reverse mechanism for steam engines provided with a link valve gear, the combination of a reversible rotary fluid pressure motor; a shaft driven by said motor; a clutch governing the operation of said shaft; connections including a worm and sector between said shaft and valve gear for shifting the latter; hand operated means comprising a lever and a rotary valve for controlling the admission of fluid pressure to said motor; and automatic means comprising a gear train, a cam, and a lever coacting with said cam adapted to actuate said hand operated means to cut off said fluid pressure when said gear has been shifted a predetermined amount, substantially as described.

6. In a power reverse mechanism for steam engines provided with a link valve gear, the combination of a rotary fluid pressure motor; a shaft driven by said motor; a clutch mounted on said shaft to govern the operation thereof; connections including a worm and sector between said shaft and valve gear for shifting the latter; manually operated means for controlling the admission of fluid pressure to said motor; and automatic means comprising a cam driven by said shaft and a pivoted lever operated by said cam adapted to actuate said manually operated means to cut off said fluid pressure when said gear has been shifted a predetermined amount, substantially as described.

7. In a power reverse mechanism for steam engines provided with a link valve gear, the combination of a fluid pressure motor; a shaft driven by said motor; a clutch to govern the operation of said shaft; connections between said shaft and valve gear for shifting the latter; means for controlling the admission of fluid pressure to said motor; automatic means comprising a gear train, a cam, and a lever, and link, adapted to actuate said controlling means to cut off said fluid pressure when said gear has been shifted a predetermined amount; and means for visibly indicating the position of said valve gear, substantially as described.

8. In a power reverse mechanism, for steam locomotives provided with a link valve gear, the combination of a rotary fluid pressure motor; a rotary shaft, driven by said motor; a clutch to govern the operation of said shaft; connections between said shaft and valve gear for shifting the latter; manually operated means for controlling the admission of fluid pressure to said motor; a lever linked to said last named means and provided with an extension; automatic means comprising a gear train, and a cam driven by said shaft adapted to coact with said lever extension to actuate said manually operated means to cut off said fluid pressure when said gear has been shifted a predetermined amount; and means controlled by said gear train for visibly indicating the position of said valve gear, substantially as described.

9. In a power reverse mechanism for steam locomotives provided with a link valve gear, the combination of a rotary fluid pressure motor; a rotary shaft driven by said motor; connections comprising a worm and sector between said shaft and valve gear for shifting the latter; a clutch to govern said connections; a manually operated rotary valve for controlling the admission of fluid pressure to said motor; a lever linked to said valve and provided with an extension; automatic means comprising a gear train and a cam driven by said shaft adapted to coact with said lever extension to actuate said controlling valve to cut off said fluid pressure when said valve gear has been shifted a predetermined amount; means connected to said gear train for visibly indicating the position of said valve gear; and means for locking said shaft in any desired position, substantially as described.

10. In a power reverse mechanism for steam locomotives provided with a link valve gear, the combination of a fluid pressure motor; a shaft driven by said motor; connections comprising a worm and sector between said shaft and valve gear for shifting the latter; a manually operated valve for controlling the admission of fluid pressure to said motor; a lever linked to said valve and provided with an extension; automatic means comprising a gear train and a cam driven by said shaft adapted to coact with said lever extension to actuate said controlling valve to cut off said fluid pressure when said valve gear has been shifted a predetermined amount; means connected to said gear train for visibly indicating the position of said valve gear; means for disengaging said motor from said shaft; means for manually rotating said shaft; and means for locking said shaft in any desired position, substantially as described.

In testimony whereof I affix my signature.

HENRY K. ADAMS.